May 21, 1935.  S. N. HURT  2,002,373

COIN CONTROLLED INDICATING DEVICE

Filed July 6, 1932   2 Sheets-Sheet 1

Samuel N. Hurt
INVENTOR
BY C. M. Marshall
ATTORNEY

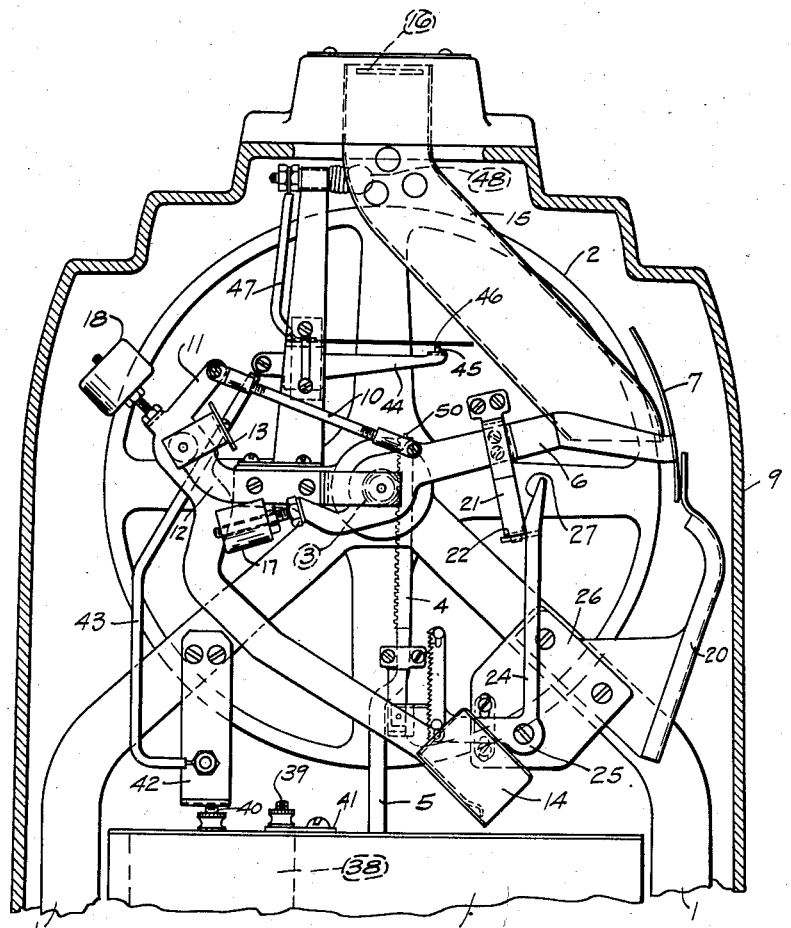

Patented May 21, 1935

2,002,373

UNITED STATES PATENT OFFICE 2,002,373

COIN CONTROLLED INDICATING DEVICE

Samuel N. Hurt, Toledo, Ohio, assignor to Toledo Scale Manufacturing Company, Toledo, Ohio, a corporation of New Jersey Application July 6, 1932, Serial No. 621,051

6 Claims. (Cl. 194—95)

This invention relates to coin controlled indicating devices, and particularly coin controlled indicating devices for weighing scales, and its principal object is to provide a coin controlled indicating device having a shutter which upon insertion of a coin opens to reveal an indication of the weight of a load on the scale and which upon removal of the load closes.

Another object is the provision of a device of this character which operates without appreciable effect upon the weighing or indicating mechanism.

Another object is the provision of means to cause the shutter to close upon an attempted interchange of loads.

Another object is the provision of a device capable of being operated by coins of varying weights and sizes and thus adapted for use without material modification in different countries.

Still another object is the provision of a device of this character not liable to become clogged and capable of withstanding much abuse.

Still another object is the provision of an illuminating device which becomes operative when the shutter is opened and a load is applied to the weighing mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a rear elevational view showing the indicating mechanism of a coin controlled person weighing scale embodying my invention and the upper portions of a coin box and an enclosing casing, the latter being partly in section and the indicating and controlling mechanism parts being shown in the positions in which they stand prior to the deposit of a coin or the application of a load to the platform.

Figure 2 is a view of the apparatus shown in Figure 1 with the parts in the positions into which they are moved by the application of a load to the scale and the deposit of a coin.

Figure 4 is an enlarged fragmentary detail view showing certain of the shutter releasing mechanism parts.

Figure 5 is a fragmentary plan view showing a window through which the weight indication is visible when the indicating and controlling mechanism parts are in the positions in which they are shown in Figure 2.

Figure 1:
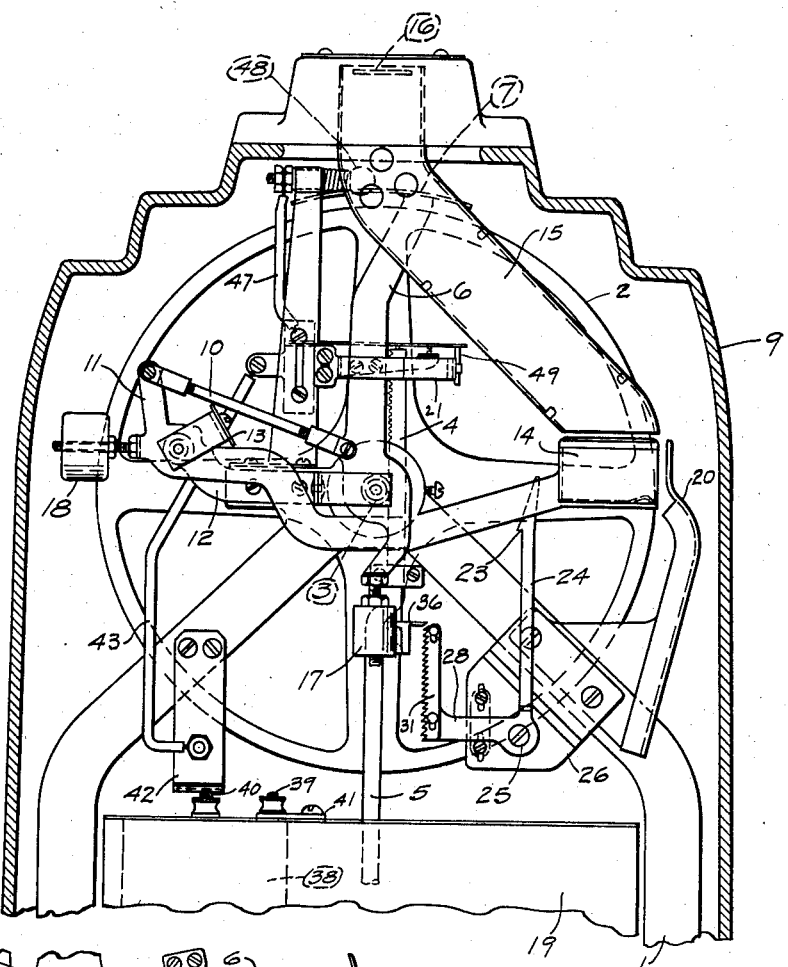
Figure 3:
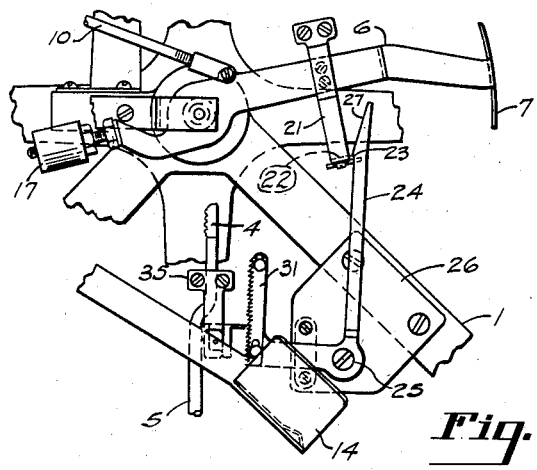
Figure 3 is a fragmentary detail view showing the shutter control mechanism parts at the instant of release by a large decrease in the load upon the scale.

Referring to the drawings in detail, the indicator which is supported upon a frame 1 consists of a revoluble wheel 2 which bears weight characters upon its periphery. Fixed to the axle of the indicator wheel 2 and turnable therewith is a pinion 3, the teeth of which mesh with the teeth of a rack 4 fixed to a downwardly extending rod 5 which is so connected to the automatic load-counterbalancing mechanism (not shown) of the scale that it is moved downwardly upon the application of a load to the scale, thus pulling the rack 4 downwardly and causing the indicator wheel 2 to revolve into such position that characters indicative of the weight of a load on the scale are carried to the top. When the load on the scale is removed or decreased the rod 5 and rack 4 move upwardly, thus causing the indicator wheel 2 to revolve in the opposite direction.

Pivotally supported on the frame 1 co-axially with the indicator wheel 2 is an arm 6 which carries at its outer end a shutter 7 normally overlying the upper part of the indicator wheel 2 and thus concealing the uppermost characters which otherwise would be visible through a window 8 in the upper end of a housing 9 which encloses the indicating and controlling mechanism. The arm 6 is connected by means of a link 10 to one end of a bell crank lever 11 that is pivoted upon a bracket 12 which is secured to the frame 1. A stop plate 13 limits the pivotal movement of the bell crank lever 11 in both directions. Upon the other end of the bell crank lever 11 is mounted a coin receiving pocket 14 which, with the parts in the position in which they are shown in Figure 1, lies directly below the lower end of a coin chute 15 supported by the housing 9 and communicating at its upper end with a coin slot 16. The arm 6 and the bell crank lever 11 are provided respectively with counterweights 17 and 18 capable of being so adjusted that, with the pocket 14 empty, they swing the arm 6 and the bell crank lever 11 to the positions in which they are shown in Figure 1.

When a coin is inserted in the slot 16, it passes through the chute 15 and drops into the pocket 14, and the condition of balance of the bell crank lever 11 and the arm 6 is such that the weight of a coin in the pocket 14 swings the bell crank lever 11 and the arm 6 into the positions in which they are shown in Figure 2, thus revealing through the window 8 the uppermost characters on the indicator wheel 2. The pocket 14 is open at one end as well as at the top, so that when the bell crank lever 11 has swung to the position in which it is shown in Figure 2 the coin drops through the open end of the pocket 14 into the coin box 19.

The coin is prevented from shooting out of the open end of the pocket 14 while the pocket is in the position in which it is shown in Figure 1 by the upper end of a guide strip 20 which acts as a closure for the open end of the pocket 14 when the pocket is in its uppermost position. The lower part of the strip 20 is channel shaped and is so located that it acts as a guide to direct into the coin box 19 such coins as may roll from the open end of the pocket 14 during its downward swing.

Secured to the arm 6 is an extending member 21 having at the end farthest from the arm 6 a ledge 22 that is adapted, when the arm 6 is in its lowermost position, to catch under a hook 23 formed upon an upwardly extending arm of a latch 24 pivoted at 25 upon a plate 26 that is secured to the frame 1. The portion of the face of the latch which extends above the hook 23 is beveled as indicated at 27. When the beveled face 27 is engaged by the ledge 22 the latch member is swung upon its pivot sufficiently to permit the ledge 22 to move past the hook 23, whereupon the latch 24 may swing back to engage the hook 23 with the ledge 22 and thus prevent the arm 6 and shutter 7 from swinging upwardly. The latch 24 is caused to swing and engage the hook 23 with the ledge 22 by the weight of a horizontally extending arm 28, but the pivotal movement of the latch is limited by means of stops 29 and 30 adjustably mounted on the plate 26 and projecting above and below the arm 28.

At the end of the arm 28 is an upwardly extending portion upon which is carried a toothed member 31, slight relative up and down movement of the toothed member being permitted by pin and slot connections 32 and 33 which connect it to the upwardly extending portion of the arm 28. The upwardly extending portion of the arm 28 is provided near its top with a single tooth 34. Pivotally supported on a bracket 35 carried by the rod 5 is a pawl 36 which when there is no load on the scale is positioned, as shown in Figure 1, above and out of engagement with the series of teeth. The end of the pawl and the teeth are so beveled that when the rod 5 moves downwardly under the influence of a load on the scale the pawl swings slightly upon its pivot 37 and rides over the tooth 34 and the teeth on the member 31, dropping, when the rod 5 reaches its lowermost position, into one of the indentations between the teeth of the member 31.

Upon a slight upward movement of the rod 5 such as usually occurs before the counterbalancing mechanism comes to rest or such as may occur by reason of the shifting of the load upon the platform, the member 31 is carried slightly upwardly by the pawl 36 without affecting the position of the latch 24, such slight upward movement being permitted by the pin and slot connections 32 and 33. If, however, the pawl 36 be engaged with the tooth 34 as it is when the load on the scale is reduced to only a few pounds, or if the load be lightened to such an extent that the member 31 is lifted to an extent exceeding the extent of free movement permitted by the pin and slot connections 32 and 33, the latch 24 is swung about its pivot and the hook 23 releases the ledge 22, thus permitting the shutter 7 to swing upwardly and conceal the characters on the periphery of the wheel 2 which were visible while the shutter was held in its lowermost position. The pawl 36 and the member 31 are so light that the position of the indicator is not appreciably affected by the condition of engagement of the pawl 36 and the member 31. In order to prevent the pawl from falling beyond the horizontal position in which it is shown in Figure 4, the bracket 35 and pawl 36 are provided with shoulders which engage when the pawl has reached horizontal position.

Contained within the coin box 19 is a dry cell 38 having terminals 39 and 40, the terminal 39 being metallically connected at 41 to the coin box 19 and thus grounded to the metal of the frame 1. The terminal 40 engages a spring clip 42 mounted on the frame 1 and insulated therefrom. When the scale is loaded and the indicator shutter is open current passes from the terminal 40 through the contact on the clip 42 and an insulated wire 43 to an insulated bracket 44 having a contact 45 which engages a resilient switch member 46 that in turn is connected by means of a second insulated wire 47 to one side of the filament of a lamp 48, the other side of the filament being grounded to the metal of the frame 1. Therefore, when there is a load on the scale and the shutter is open, the lamp 48 serves to illuminate the characters which are visible through the window.

Fixed adjacent the end of the extending member 21 is a fiber pin 49 which when the shutter 7 is in position to eclipse the characters on the periphery of the wheel 2 engages the resilient switch 46 and holds it away from the contact 45 on the bracket 44. Therefore, no current is consumed while the shutter is closed. A second fiber pin 50 carried at the upper end of the rack 4 engages the resilient switch 46 and holds it away from the contact 45 when there is no load on the scale. Therefore, no current is consumed unless the shutter is open and the scale is under load.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism, an indicator, means for connecting said weighing mechanism to said indicator, a shutter for revealing or concealing said indicator, coin controlled means for opening said shutter, latch means for holding said shutter open, and means for releasing said latch means, said releasing means comprising a relatively movable pawl and a series of teeth mounted respectively on said connecting means and said latch means.

2. In a device of the class described, in combination, an indicator, a shutter for revealing or concealing said indicator, coin controlled means for opening said shutter, a latch for holding said shutter open, means for releasing said latch, said releasing means comprising a relatively movable pawl and a series of teeth, means whereby said teeth and pawl are movable over each other in one direction without releasing said latch, and means for releasing said latch after a limited movement of said pawl and said teeth over each other in the opposite direction.

3. In a device of the class described, in combination, an indicator, a shutter therefor, coin controlled means for opening said shutter, a latch for holding said shutter open, said latch including a member having a series of teeth, said member being mounted for limited movement, and a pawl adapted to ride over said teeth upon movement in one direction and to engage said teeth upon movement in the opposite direction.

4. In a device of the class described, in combination, an indicator comprising a revoluble member having characters distributed about its center of revolution, a shutter mounted to swing about an axis substantially coincident with the center of revolution of said revoluble member, means operative by the weight of a coin for swinging said shutter about its axis and thereby opening it, said coin operative means comprising an arm fulcrumed at a point substantially removed from said center of revolution, means for connecting said arm and said shutter, means for holding said shutter open, and means operative upon movement of said revoluble member in one direction for releasing said holding means.

5. In a device of the class described, in combination, an indicator comprising a revoluble member having characters distributed about its center of revolution, a shutter mounted to swing about an axis substantially coincident with the center of revolution of said revoluble member, means operative by the weight of a coin for swinging said shutter about its axis and thereby opening it, said means comprising a counterbalanced arm fulcrumed at a point substantially removed from said center of revolution, pivoted adjustable means for connecting said arm and said shutter, means for holding said shutter open, and means operative upon movement of said revoluble member in one direction for releasing said holding means, said holding means comprising a latch, said releasing means comprising a pawl and a toothed member, one of which is connected to the latch.

6. In a device of the class described, in combination, an indicator comprising a revoluble member having characters distributed about its center of revolution, a shutter mounted to swing about an axis substantially coincident with the center of revolution of said revoluble member, means operative by the weight of a coin for swinging said shutter about its axis and thereby opening it, said coin operative means comprising an arm fulcrumed at one end at a point substantially removed from said center of revolution, a coin pocket provided on the other end of said arm, and said arm lying substantially within the confines of said chart, means for counterbalancing said arm and said coin pocket, connecting means between said arm and said shutter, means for holding said shutter open, and means operative upon movement of said revoluble member in one direction for releasing said holding means, said holding means comprising a latch, said releasing means comprising a pawl and a toothed member, one of which is connected to the latch, said toothed member being capable of limited individual movement.

SAMUEL N. HURT.